United States Patent [19]

Cavasa et al.

[11] Patent Number: 5,579,511
[45] Date of Patent: Nov. 26, 1996

[54] METHOD AND APPARATUS FOR CHECKING THE INTEGRITY OF A COMPLEX COMPUTER INSTALLATION USED IN THE FLIGHT CONTROL OF AN AIRCRAFT

[75] Inventors: Victor Cavasa, Pilarac; Patrick Schuster, Toulouse, both of France

[73] Assignee: Aerospatiale Societe Nationale Industrielle, Paris, France

[21] Appl. No.: 324,374

[22] Filed: Oct. 17, 1994

Related U.S. Application Data

[63] Continuation of Ser. No. 78,425, Jun. 17, 1993, abandoned.

[30] Foreign Application Priority Data

Jun. 18, 1992 [FR] France .................................. 9207430

[51] Int. Cl.$^6$ ............................................. G06F 13/10
[52] U.S. Cl. ..................... 395/500; 395/284; 395/828; 395/830; 364/DIG. I; 364/DIG. II
[58] Field of Search ............................. 395/500, 284, 395/828, 830

[56] References Cited

U.S. PATENT DOCUMENTS

| | | | |
|---|---|---|---|
| 4,951,192 | 8/1990 | Chase, Jr. et al. | 395/700 |
| 5,081,297 | 1/1992 | Lebel et al. | 395/325 |
| 5,109,484 | 4/1992 | Hughes et al. | 395/200 |
| 5,125,081 | 6/1992 | Chiba | 395/325 |
| 5,165,018 | 11/1992 | Simor | 395/300 |
| 5,233,510 | 8/1993 | Brueckner et al. | 364/131 |
| 5,247,683 | 9/1993 | Holmes et al. | 395/700 |
| 5,253,344 | 10/1993 | Bostick et al. | 395/275 |
| 5,257,368 | 10/1993 | Benson et al. | 395/600 |
| 5,367,686 | 11/1994 | Fisher et al. | 395/700 |

FOREIGN PATENT DOCUMENTS

| | | |
|---|---|---|
| 0468803 | 1/1992 | European Pat. Off. . |
| 2202062 | 9/1988 | United Kingdom . |
| 2203869 | 10/1988 | United Kingdom . |
| WO89/12274 | 12/1989 | WIPO . |

OTHER PUBLICATIONS

Updating Software And Configuration Data in A Distributed Communications Network by Carl W. Symborski, IEE 1988 (pp. 331–338).

*Primary Examiner*—Krisna Lim
*Assistant Examiner*—Zarni Maung
*Attorney, Agent, or Firm*—Michael N. Meller

[57] ABSTRACT

A method for checking the compatibility of a complex installation which incorporates various electronic, electrical and mechanical units of apparatus including at least one computer when one of the units is substituted by another substantially equivalent unit. The method comprises: (a) recording identification codes for each of the units of apparatus comprising the installation, including the identification code of replacement devices so as to obtain a base of the new configuration of the installation; (b) recording in computer memory a reference base for the identification codes of the devices of the installation corresponding to the former configuration, and (c) comparing the reference base of the identification codes of the former configuration with the base of the identification codes of the new configuration so as to trigger an alarm when this comparison indicates a configuration change.

5 Claims, 4 Drawing Sheets

METHOD AND APPARATUS FOR CHECKING THE INTEGRITY OF A COMPLEX COMPUTER INSTALLATION USED IN THE FLIGHT CONTROL OF AN AIRCRAFT

This application is a continuation, of application Ser. No. 08/78,425, filed Jun. 17, 1993, abandoned.

FIELD OF THE INVENTION

The present invention concerns a method to check the configuration of a complex installation and a device to implement said method.

BACKGROUND OF THE INVENTION

This method and this device can be applied to complex installations with a specific or open-ended configuration. These installations generally include combined devices, such as sensors, processing systems including computers controlling, for example, servo-systems, and generally speaking interacting combined devices so as to obtain the sought-after result.

The configuration of an installation is determined by those who design said installation. This configuration more particularly defines the organization of the various operational devices comprising the installation, the essential functional specifications of these devices, the linkings, as well as interactions between said devices. A predetermined configuration of an installation enables the latter to carry out processings in order to accomplish predetermined actions so as to obtain the desired result. Conversely, a non-authorized configuration of an installation does not enable this installation to embody everything expected from it in desired conditions, these conditions extending from an insufficient level of security to a total absence of the service rendered.

Installations of this type may be complex units, such as stations for tracking satellites and stations for processing signals exchanged with these satellites, navigation stations on sea vessels, motor vehicles equipped with on-board computers processing signals derived, for example, from sensors furnishing the parameters relating to movement or braking, operating control stations of nuclear power stations, airplane pilot cockpit stations, etc.

The checking methods and devices of complex installations ought to be able to provide increased operating safety of these installations by means of affording strict monitoring of their configurations.

For example, in an aircraft, safety is a major concern of aircraft constructors who are increasingly seeking to provide "electric flight control" installations or systems including in particular computers, servo-systems, sensors, etc. A large portion of these systems mainly concerns the monitoring and manoeuvering of the aircraft by one or several pilots from a central piloting station.

Each installation generally has a long period of life (several years). The placing into operation of the installation is only effective after successive phases including in particular the research and design phases, the production of a prototype, the first start up, the tests rendering the need for modifications and then the production of series installations.

The series installations are themselves subjected to configuration evolutions over a period of time, either for the particular needs of a user, or so as to improve quality, robustness, the reliability of the installation, but also so as to obey new regulations or use new technologies having improved performances, or because the earlier technologies had become unavailable.

This configuration evolution is common in larger aircraft which are that much more concerned when the latter are more modern and consequently make use of a larger number of computers. Any configuration evolution needs to be managed carefully and methodically, especially for reasons of safety. This is particularly necessary when replacing an old functionnal device by a new one in an installation for checking the compatibility of this new device with the other devices of the installation. In fact, any new functional devices introduced into an installation to replace the older device must not disturb the functioning of the installation and the latter needs to remain able to provide at least the orders supplied up to there, or even better, improve their quality.

Currently, there is no automatic way to check the validity of the configuration of a data and signal processing installation, especially when one or several of the combined functional devices of this installation are replaced by new devices.

In the current state of the art, for an installation comprising in particular several computers receiving and exchanging data or information for processing this data or information, the maintenance technician, who replaces one computer by another or modifies a program of a computer in an installation or replaces one sensor by another, modifies the configuration of the installation. For example, this replacement may occur when the computer has broken down. The technician then has the choice of replacing the old computer by an identical computer functioning with the same program, or replacing the old computer by an equivalent computer with a program so that the inputs/outputs of the new computer are identical to the inputs/outputs of the old computer (throughout the continuation of the description, the term "computer" shall denote, not merely the hardware, but also the software).

By observing certain conditions, the technician is also able to replace one computer by a non-equivalent computer, this being the case when no identical or equivalent computer is available or when this replacement is asked for by the designer of the installation who wishes to modify the installation configuration, when requested by a user, or to improve the quality of functioning of this installation. The configuration modification of the installation resulting, for example, from replacing one computer by a non-equivalent computer, requires that the technician upkeeps the procedures for verifying the coherence of the functioning of the installation. These procedures are long, complicated and human error during these checks is still a risk which might result in serious consequences.

The above-mentioned example of a replacement concerns a computer, but this replacement may be that of one or several other functional devices of the installation, such as sensors, measuring circuits, etc.

The maintenance technician checks the coherence of the installation on the basis of information contained in a maintenance manual or on technical cards.

So as to check this coherence, he needs first of all to check the interchangeability conditions of an existing device of the installation by means of a new device.

He then needs to check the compatibility conditions between the new device replacing the predetermined existing device and the other devices of the installation cooperating with this new device. All the devices of the installation, as well as the new device, are marked by identification codes.

The interchangeability conditions needing to be verified are the following:

1. SINGLE INTERCHANGEABILITY a) There is single interchangeability when an existing device bearing a predetermined identification code is replaced by a device bearing the same identification code.

For example, this is applicable when a standard computer of a predetermined brand functioning with a predetermined program is replaced by a computer of the same type and brand and functioning with a program identical to the predetermined program.

This is also applicable for a computer in which an operating error appears during running of the used program. When the error is corrected, it is the predetermined identification code which continues to be used. The existing device in fact has not been replaced.

b) There is also single interchangeability when a new device bearing a new identification code is able to replace the existing device bearing a predetermined identification code.

This is applicable when a predetermined program used in a computer of an installation is replaced by a new program capable of carrying out the same processings as the existing program.

c) Finally, there is also single interchangeability when a new device bearing a new identification code can only be replaced by a new device bearing the same identification code.

This is the case when a new program has been introduced into a computer as it possesses improved efficiency. This new program may only be replaced by an identical program, for example in the event of an error occuring during running of the new program. When this error is corrected, it is the new identification code which continues to be used.

2. DOUBLE INTERCHANGEABILITY

There is double interchangeability when an existing device bearing a predetermined identification code can be replaced by a new device bearing a new identification code or vice versa.

This is applicable when a predetermined standard 286SX computer operating with a predetermined program (this unit bearing a predetermined identification code) is replaced by a standard 386SX computer operating with a program identical to the predetermined program. The 386SX computer and its program bear a new identification code. They may mutually be replaced by the former 286SX computer and its predetermined program bearing the predetermined identification code. In fact, in both cases, the inputs and outputs of the computers are identical.

3. NONINTERCHANGEABILITY

A device having a predetermined identification code or a device having a new identification code may exclusively only replace a device having an identical identification code.

This is applicable when a computer of a predetermined type and mark functioning with a predetermined program can only be replaced by a computer of the same make and type and using the same program.

This is also applicable when the configuration of an installation has evolved for technical reasons and that a new computer using a new program has replaced a predetermined computer using a predetermined program. This new computer and the new program can only be replaced by an identical computer and program.

The compatibility conditions needing to be verified are the following:

1. OPERATIONAL COMPATIBILITY

When in an installation a new device having a new identification code replaces a predetermined device having a predetermined identification code, it is necessary to ensure that this new device embodies with a total identity the functions of the predetermined device. Functional compatibility requires that one of the two first interchangeability conditions (single interchangeability and double interchangeability) is checked.

2. INTERNAL COMPATIBILITY

For reasons of security, certain installations comprise several redundant parallel channels carrying out the same functions. The functional devices of different channels are identical. Checking of internal compatibility consists of ensuring that the designer of the installation authorizes the replacement of a predetermined device in one of the channels and having a predetermined identification code by a new device having a new identification code but carrying out the same functions as the predetermined device.

3. EXTERNAL COMPATIBILITY

This external compatibility needs to be checked in installations comprising several systems interconnected by inputs and outputs for exchanging data. Checking the external compatibility consists of ensuring that the replacement in one of the systems of a predetermined device having a predetermined identification code by a new device having a new identification code does not interfere with the exchanges of data between the various systems of the installation.

It has been seen, as indicated earlier, that the configuration checking of an installation in which one or several functional devices is/are replaced is a difficult, long, fastidious and costly undertaking for a maintenance technician. Furthermore, the technician may make checking errors likely to result in serious consequences, especially when this concerns the electric flight control installations of an aircraft.

SUMMARY OF THE INVENTION

The precise aim of the invention is to resolve these drawbacks by means of an automatic method and device for checking the configuration of a complex installation. The automatic action of the method and device significantly facilitate the work of the maintenance operator, makes it possible to considerably reduce the checking times and ensure much greater security of checking of the configuration of an installation.

First of all, the invention concerns a method for checking the configuration of a complex installation, this installation comprising combined devices having a predetermined configuration and including computers and sensors connected to the inputs of computers to provide them with data and signals to be processed, the installation controlling functional units connected to the outputs of the combined devices so as to receive control signals, said method consisting of:

allocating to each device of the installation an identification code corresponding to the structure and the functional specifications of this device, checking if the replacement of at least one existing device of the installation to which a predetermined identification code is allocated by a new device with a new identification code results in a change of the predetermined configuration of the installation likely to disturb the control signals provided by the installation, said checking consisting of:

recording in a memory of a computer a base of identification codes of the devices of the installation, including the identification code of the new device, so as to obtain a base of the new configuration of the installation, recording in the memory of said computer a reference base of the identification codes of the devices of the installation prior to said replacement, this base corresponding to the former configuration of the installation, comparing the reference base of the identification codes of the old configuration with the base of the identification codes of the new configuration so as to trigger an alarm when the comparison indicates a change of configuration.

According to a further characteristic, the method also consists of ensuring that:

the new device is interchangeable with the existing device, the new device is interchangeable and compatible with the other devices of the installation, the reference base containing a dictionary of the interchangeable and compatible devices.

According to another characteristic of the method, the latter consists of recording the new configuration of the installation in a bulk storage memory of the computer when, after said comparison, the new device is interchangeable and compatible with the existing device it replaces.

According to another characteristic, the method consists of then verifying all the criteria of the following cases of compatibility:

operational compatibility, internal compatibility when a new device replaces an existing device in the set of the redundant devices of the system, this new device needing to be compatible with all the other redundant devices of the set, external compatibility when the inputs and outputs of a system of the installation having a new configuration are compatible with the inputs and outputs of the other systems of the installation.

The invention also concerns a device for checking the configuration of a complex installation for implementing the method, wherein it comprises a computer and its memory dedicated at least to checking of the configuration, means for loading into the memory of the computer said reference base of the identification codes, this memory further containing a control program for recording the identification codes and further containing a program for recording the identification codes of the means of the installation to be controlled, and a program for comparing the reference base of the identification codes of the former configuration and the base of the identification codes of the new configuration and display means connected to the computer so as to furnish an alarm message on account of an unauthorized configuration modification, to indicate the causes of this unauthorized modification and indicate the identification code of the new device introduced into the installation and which has provoked this alarm, these display means also furnishing a message relating to the authorization for using the new configuration when the comparison has not triggered any alarm, this new configuration then being recorded in said modification means.

BRIEF DESCRIPTION OF THE DRAWINGS

The characteristics and advantages of the invention shall appear more readily from a reading of the following description with reference to the accompanying drawings on which.

DETAILED DESCRIPTION OF THE PREFERRED EMBODIMENTS

Figure 1:
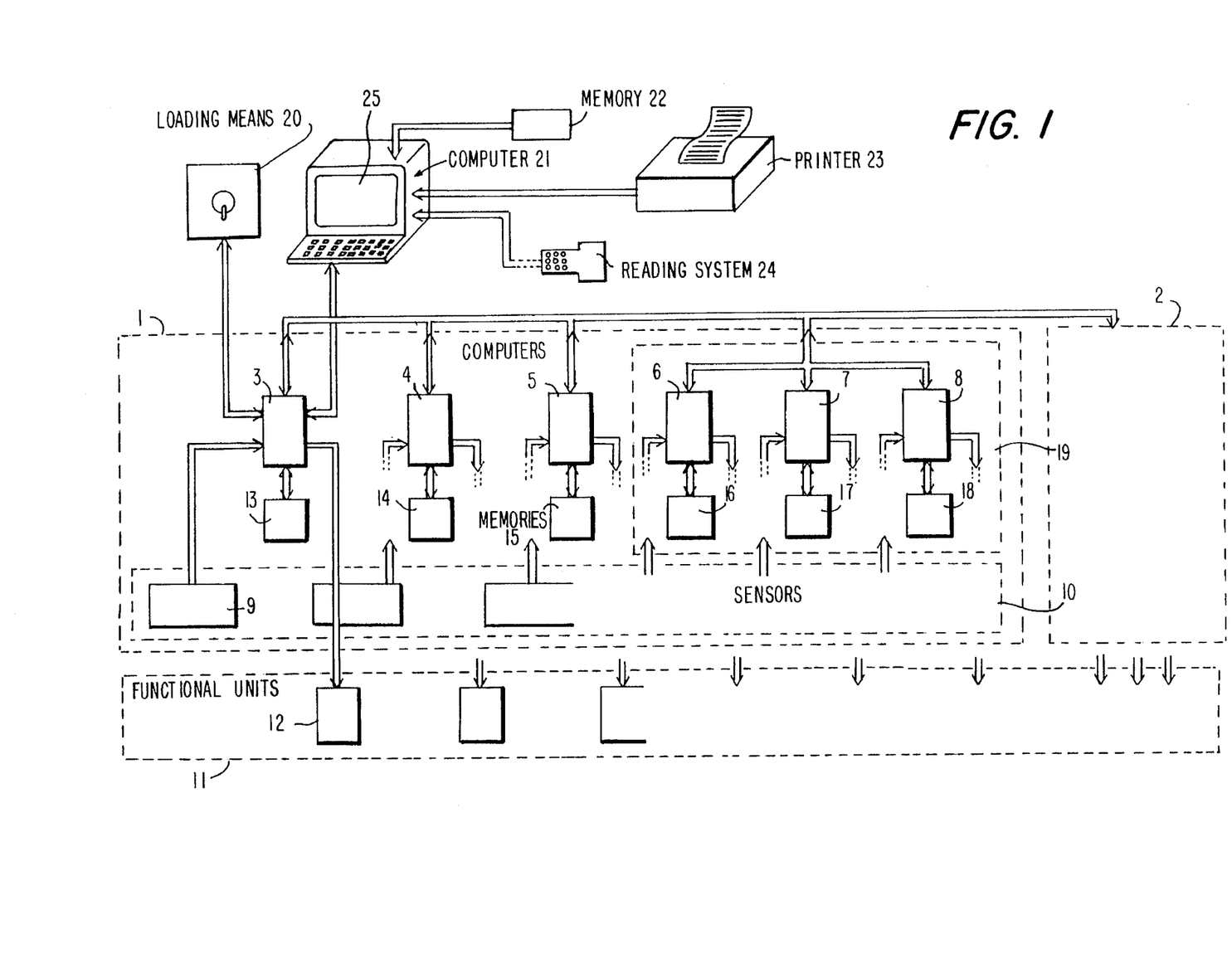
FIG. 1 diagrammatically shows an example of a complex installation checked by a device implementing the method of the invention.

FIG. 1 diagrammatically represents a complex installation comprising for example two systems 1 and 2 including combined devices making it possible to obtain a desired result. Only the system 1 has been shown in detail on the figure.

This system comprises combined devices having a predetermined configuration. In the example shown on the figure, the system 1 includes computers 3, 4, 5, 6, 7 and 8 and sensors 9, 9a, 9b, etc. connected to the inputs of the computers. For clarity only three of the set of sensors 10 has been shown on the figure.

The set of sensors 10 are connected to the inputs of the computers 3, 4, 5, etc. so as to provide them with data and signals to be processed. For example, for an aircraft, the sensors 9, 9a, 9b, etc. correspond to temperature, fuel flowrate, speed sensors, etc. The installation controls a set of functional units 11 composed of individual units 12, 12a, 12b, etc. connected to outputs of corresponding computers 3, 4, 5, etc. to supply them with control signals. For clarity only the first three functional units 12, 12a and 12b of the set of functional units 11 have been shown as an example on the figure. For an aircraft with electric flight controls, these functional units may be servo-systems.

In the system shown as an example on the figure, each computer is of course connected to a memory. These memories are shown at 13, 14, 15, 16, 17 and 18 and are respectively connected to the computers 3, 4, 5, 6, 7 and 8.

It has been assumed that the computers 6, 7 and 8 form a unit 19 composed of several redundant channels, this frequently being the case in an aircraft, for reasons of safety. In fact, all the channels process identical data or signals and provide identical commands so that if one of the channels breaks down, the other two channels continue to carry out the same processings and provide the same commands.

The configuration of this installation is essentially shown by the identification codes of the combined devices constituting it (which in this instance are the computers and their memories, the sensors, the functional units, the programs recorded in the memories, etc), as well as by the input/output links of the computers and other miscellaneous devices. The identification code of each computer may be recorded in the memory of the computer or in a register of this computer. The identification codes of the other devices of the installation, such as the sensors, may be bar codes entered on labels able to be read by suitable devices.

The configuration checking device of the invention essentially includes one of the computers 3, for example, and its memory 13 containing a program dedicated to checking the configuration of the installation, and means 20 for loading into the memory 13 of the dedicated computer 3 a reference base of the identification codes of the various devices of the installation prior to said installation being modified. These devices for recording the reference base may be constituted by a floppy disk whose reader 20 is connected to the dedicated computer 3.

The device also comprises a computer 21 with display means 25. A keyboard 26 is made available for the maintenance operator for controlling the floppy disk reader 20. This computer is also connected to a memory 22, a printer 23 and to a bar code reading system 24.

The memory 22 of the computer 21 contains a program for recording the identification codes of the various devices of the installation. This program is remote-loaded into the memory 13 of the computer 3. The identification codes of the computers of the installation are transmitted directly to the computer 3 by the other computers so as to be recorded in the memory 13. As regards the other devices, such as the sensors, the identification codes are transmitted by the bar code reader 24.

The computer 3 is also provided by the computer 21 with a program able to compare the identification codes of the various devices of the installation transmitted by the other computers and the reader 24 and reference identification codes.

Figure 2:
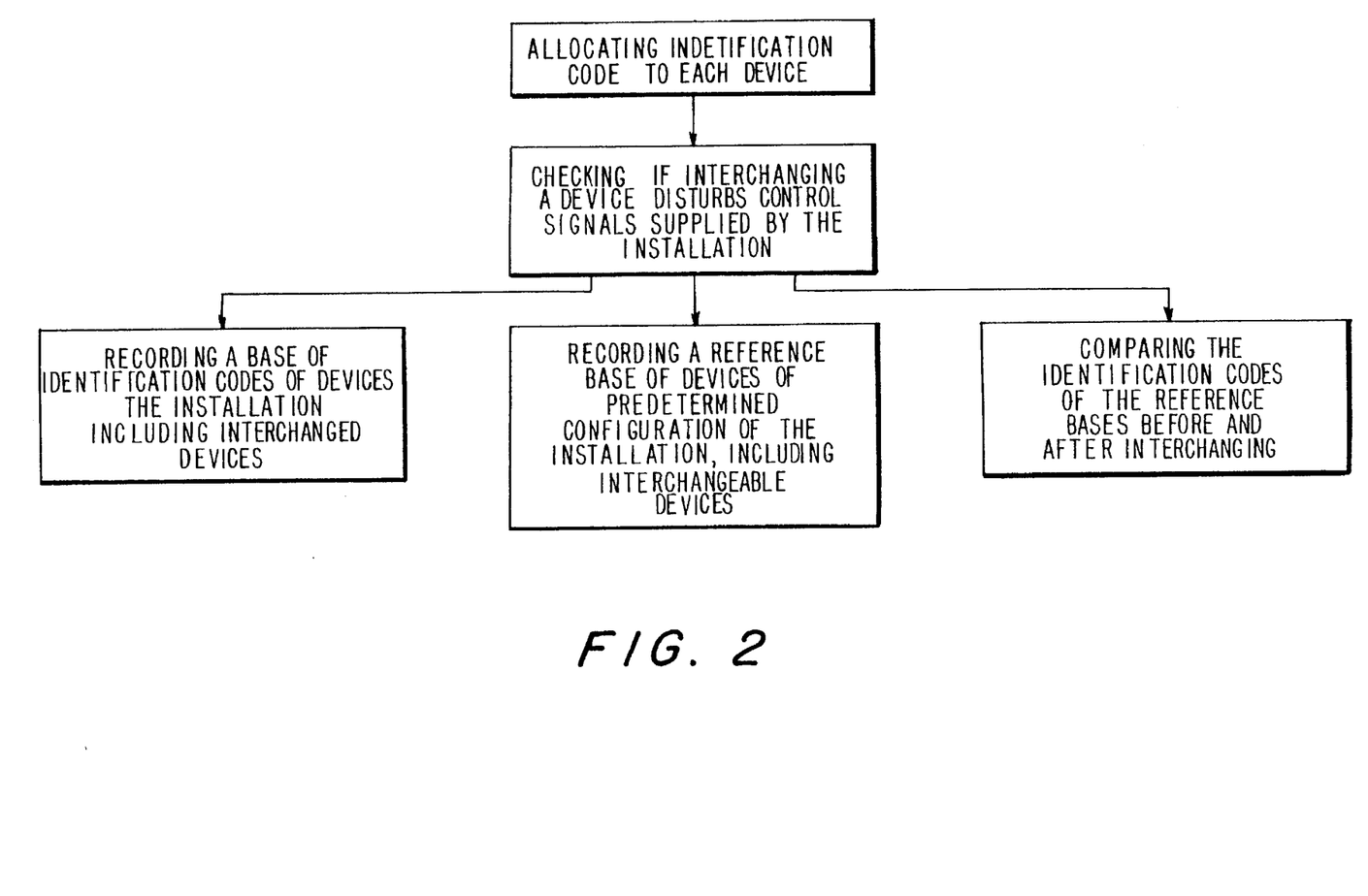
FIG. 2 is a flow chart showing the main stages of a checking method of the invention.

FIG. 2 is a flow chart describing the main stages of the configuration checking method of the invention.

Figure 3:
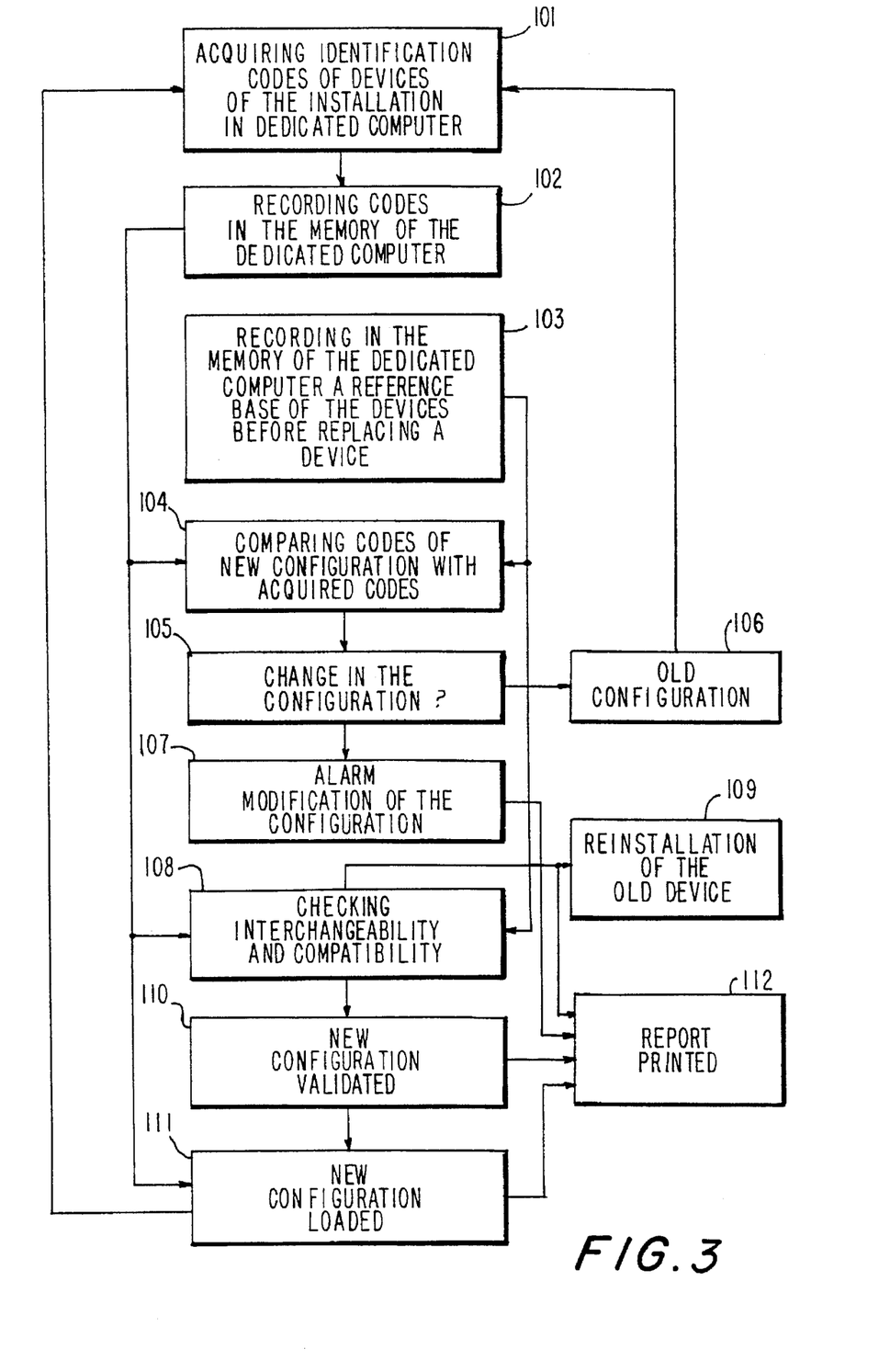
FIG. 3 is a flow chart describing with more detail the main stages of the checking method of the invention.

In FIG. 3, these stages are shown with more detail.

It has been assumed that each device of the installation is allocated with an identification code corresponding to the structure and the functional specifications of this device. This is why, for example, for a computer, the identification code could correspond to the type and mark of the computer and the program it uses.

Once these codes have been allocated, it is then necessary to check if the replacement of an existing device, such as a computer and/or its associated program to which a predetermined identification code is allocated by a new device allocated with a new identification code, does not disturb the coherence of functioning of the installation and in particular does not disturb the control signals provided by the installation.

This checking, consisting of checking the coherence of the new configuration of the installation, is obtained automatically with the aid of the method of the invention whose main stages are shown in detail on FIG. 3.

The first stage 101 consists of acquiring the identification codes of the various devices of the installation. These codes are acquired by the dedicated computer 3, either directly or by means of the bar code reader 24.

They are recorded in the memory 13 of this computer during the next stage 102. Of course, it is assumed that the initial and predetermined configuration of the installation has been modified by replacing an existing device bearing a predetermined identification code by a new device bearing a new identification code.

The next stage 103 consists of recording in the memory 13 of the dedicated computer 3 a reference base of the identification codes of the devices of the installation prior to replacing at least one of the devices of this installation. In actual fact, this base is a list of the existing devices of the installation before its configuration has been modified. The reference base is provided by the floppy disk 20 following an order supplied by the maintenance operator acting on the keyboard of the computer 21. The reference base is remote-loaded into the memory 13 of the computer 3.

The stage 104 consists of comparing the acquired codes relating to the new configuration of the installation after replacing one or several existing devices by one or several new devices. This comparison and the following checking operations is controlled by a program recorded in the memory 22 of the computer 21 and which is remote-loaded into the memory 13 of the computer 3.

The stage 105 results from the preceding stage and consists of checking as to whether there has been any change of the configuration of the installation.

If there has been no change of configuration, the existing configuration is validated. The screen 25 of the computer 21 may then display a message, such as "old configuration in service", as indicated at 106.

If there has been a change of configuration, an alarm appears during the stage 107. This alarm may be expressed by a message, such as "modification of configuration" appearing on the display screen 25 of the computer 21.

The appearance of an alarm during stage 107 does not necessarily mean that the new configuration is acceptable.

The only case where the new configuration is unacceptable is when a predetermined existing device has been replaced by a new device which is not interchangeable or incompatible with this existing device.

The stage 108 is the actual checking of interchangeability and compatibility of one or several devices of the installation with the existing devices in the initial configuration. To this effect, the reference base of the identification codes of the devices of the installation, prior to modification of the configuration, contains a dictionary of the compatible and interchangeable devices.

If in the installation a new device bearing a new identification code has replaced an existing device and if this new device is not interchangeable with the existing device, only the reinstallation during stage 109 of the old device having the old predetermined identification code could stop the alarm. The method is then implemented again identically from the stage 101 and the display screen 25 shall normally display the message "old configuration in service".

If the new device which has replaced an existing device is interchangeable, it is necessary to additionally check, as shall be seen later in detail with the aid of figure, the compatibility of this new device with the other devices of the installation.

If the new device is incompatible, only the reinstallation of the existing device (stage 108) bearing the predetermined identification code is able to allow for a revalidation of the old configuration by restarting the method during stage 101.

If the new device bearing a new identification code and has replaced an existing device bearing a predetermined identification code is interchangeable with this existing device and compatible with the other devices of the installation, following the checking made during stage 108, the new configuration is validated during stage 110; the new base of the identification codes of the devices of the new configuration may then be loaded during stage 111 into the floppy disk 20.

A report may be printed (stage 112) by the printer 23 so as to be filed. This report indicates the configuration modification alarms, the results of checks of interchangeability and compatibility, the validation of a new configuration and the authorization of its loading into the filing memory, such as the floppy disk 20. The alarm is stopped and the message "new configuration validated" may be displayed on the screen 25.

The method may then restart continuously from stage 101.

Figure 4:
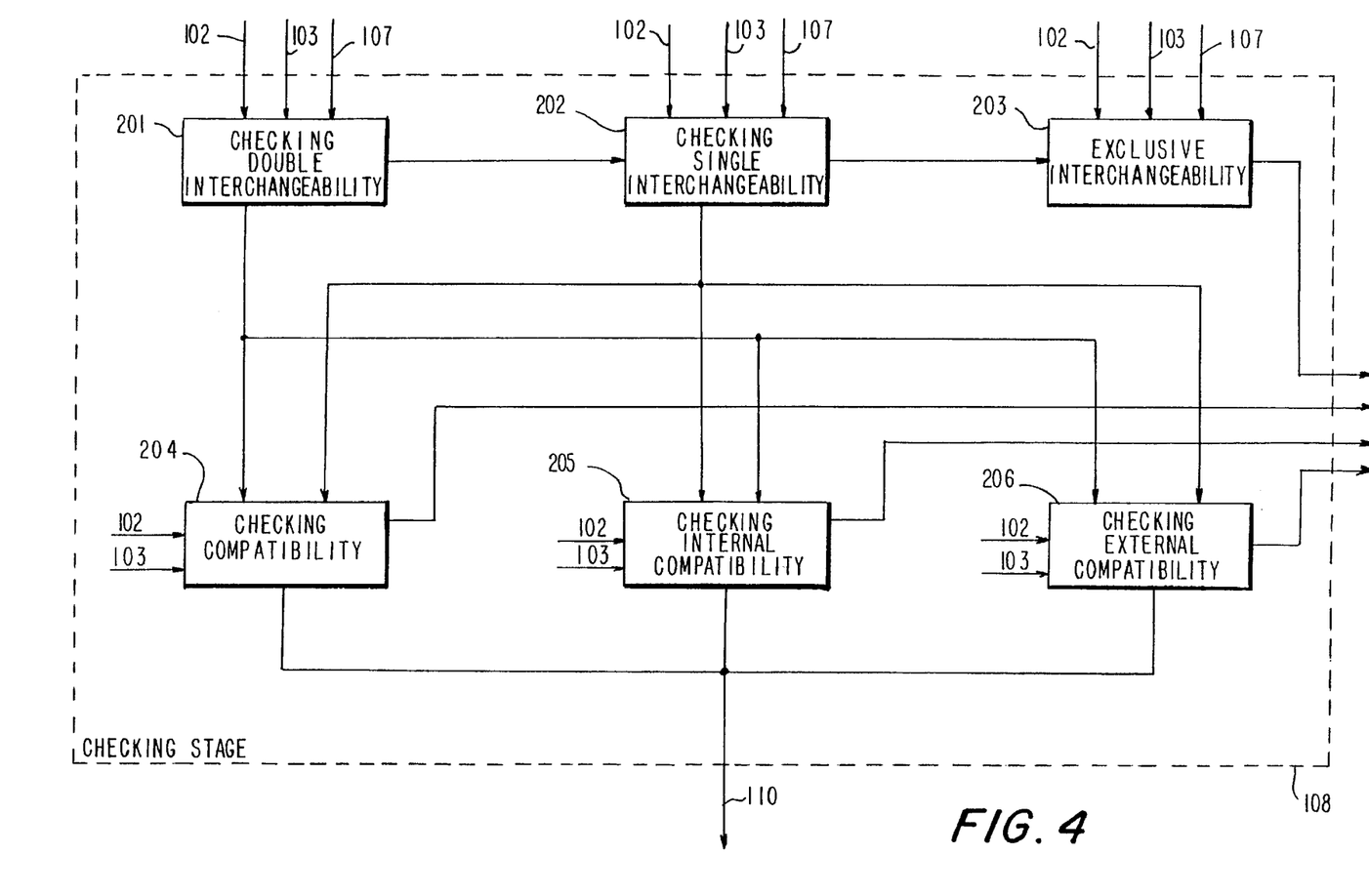
FIG. 4 is a flow chart describing more specifically the stages relating to checkings of interchangeability and compatibility shown in the flow chart of FIG. 2.

FIG. 4 is a flow chart explaining in more detail the stage 108 for checking interchangeability and compatibility.

This checking is effected from the base of the identification codes of the devices of the new configuration acquired during stage 102 and the reference base of the identification codes remotely-loaded during stage 103 by the floppy disk. This checking results from the alarm appearing during stage 107.

The first checking (stage 201) consists of checking if there is double interchangeability. If there is no double interchangeability, it is necessary as indicated at 202 to check whether there is any single interchangeability. If there is no single interchangeability, this means that the interchangeability is exclusive as indicated at 203 and that the new device bearing a new identification code cannot be used. The only possibility is the reinstallation (stage 109) of the existing device bearing the predetermined identification code. This impossibility of interchangeability is mentioned on the report 112.

The cases of single, double or exclusive interchangeability have been defined earlier.

In the event of double or single interchangeability subsequent to stages 201 or 202, it is necessary to check the functional compatibility (stage 204), internal compatibility (stage 205) and external compatibility (stage 206) of the new device bearing a new identification code with the other devices of the installation. The definitions of these various types of compatibility have been given earlier.

If any type of incompatibility appears, then a report is printed (stage 112) and only reinstallation of the existing device instead of the new device may be considered (stage 109) prior to configuration modification.

If on the contrary the internal and external functional compatibilities are validated, the new configuration may itself be validated (stage 110).

The checking of internal compatibility may be rendered necessary in the installation shown on FIG. 1, for example in the case of replacing one of the computers of the set of redundant channels 19.

The checking of external compatibility may be rendered necessary, for example when one computer of the system 1 of the installation is replaced. This replacement needs to be compatible with the exchanges of incoming and outgoing data between the system 1 and the system 2.

The invention is able to attain the above-mentioned aims and in particular automate and improve security of the configuration checking of an installation undergoing modifications.

What is claimed is:

1. Method for checking the operating characteristics of a complex installation, used in the flight control of an aircraft before starting of the installation with said installation comprising at least one system of combined electronic devices with each device having functional specifications and with said system including at least one computer having a memory, said installation having a predetermined configuration and having functional units connected to said combined devices for receiving control signals, said method consisting of:

allocating to each device in said installation an identification code corresponding to the structure and the functional specifications of this device, checking with said computer before starting said installation if the interchanging of at least one existing device of the installation, to which a predetermined identification code is allocated, by a new device to which a new identification code is allocated, to determine if a change of the predetermined configuration of the installation will disturb the control signals supplied by the installation, wherein said checking consists of:

recording in the memory of said computer, a base of identification codes for the devices of the installation, including the identification codes of the interchanged device, so as to obtain a base of a new configuration of the installation, after the interchanging, recording in the memory of said computer a reference base of the identification codes of the devices of the installation, this reference base corresponding to the predetermined configuration of the installation, before the interchanging, and with the reference base containing a dictionary of devices which are interchangeable and compatible with the devices of the installation, comparing with the computer the identification codes of the reference base, before the interchanging with the identification codes of the reference base of the new configuration, so that the computer starts an alarm when the comparison between the reference base before and after the interchanging of devices indicates that the configuration of the installation has changed to the extent that it is no longer compatible with the reference base.

2. Method according to claim 1, wherein it also consists of checking with a computer, if:

a device of the installation is interchangeable with a new device, the new device is interchangeable and compatible with the other devices of the installation, the reference base containing a dictionary of the devices which are interchangeable and compatible with the devices of the installation.

3. Control method according to claim 2, wherein it consists of recording the new configuration of the installation in a filing memory of said computer when, after said comparison, the interchanged device is existing compatible with the existing device it replaces in the installation.

4. Control method according to claim 2, wherein it consists of then checking with the computer the existence of cases of the following compatibilities:

functional compatibility, internal compatibility when a new device replaces device of the installation in a set of redundant devices of a system of the installation, this replacement device needing to be compatible with the other redundant devices of the set, external compatibility when the inputs and outputs of a system of the installation having a new configuration after replacement of at least one device need to be compatible with the inputs and outputs of at least one other system of the installation.

5. Apparatus for checking the operational characteristics of a complex installation used in the flight control of an aircraft before starting of the installation with said installation comprising at least one system of combined electronic devices having a fixed and predetermined configuration defining essential functional specifications of such devices in said system, and having functional units connected to outputs of the combined devices for receiving control signals, and with said apparatus comprising computer means having a memory with a reference base in which each device is recorded an identification code corresponding to the structure and the functional specifications of the device, the identification codes of the devices being recorded in said reference base of said memory with the reference base containing a dictionary of the devices which are interchangeable and compatible with the devices of the installation, said memory further containing a program for checking before starting the installation if a device of the installation is interchangeable with a new device by reference to said dictionary in said reference base and a program for comparing identification codes of the devices in said reference base before changing the configuration of the installation with the identification codes of the devices of the installation after changing at least one device in said system, this changing giving to the installation a new configuration, the apparatus further comprising display means connected to said computer means so as to supply an alarm message on account of an unauthorized configuration modification if the configuration change is not compatible with the reference base, to indicate the causes of this unauthorized modification and to indicate the identification code of the device changed in the installation causing this alarm with said display means also providing a message relating to the authorization of use of the new configuration when the comparison has not triggered the alarm and with such new configuration then being recorded in said memory.

* * * * *